Figure 4:
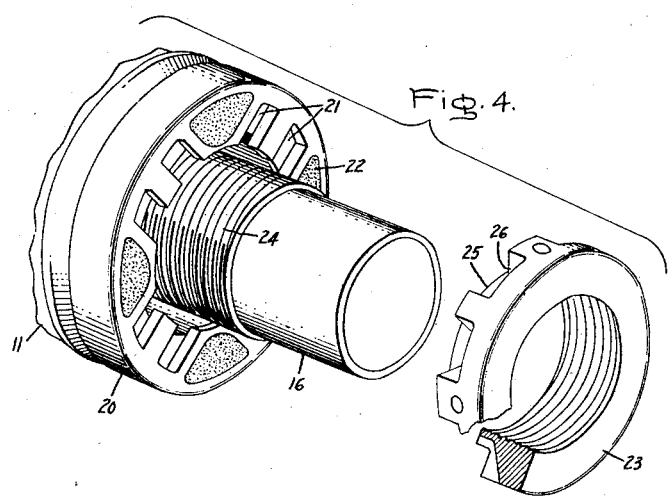

Dec. 12, 1944.     W. G. HARLOW     2,364,974
SWITCHGEAR
Filed April 5, 1943     2 Sheets-Sheet 1
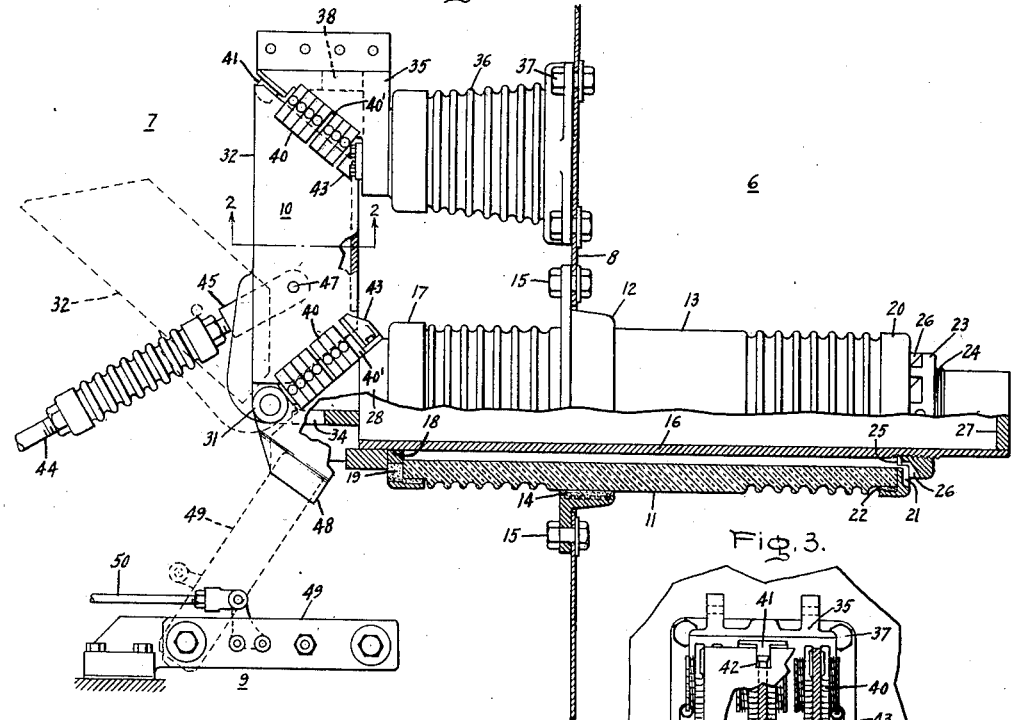
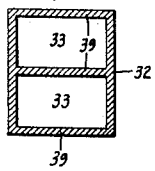
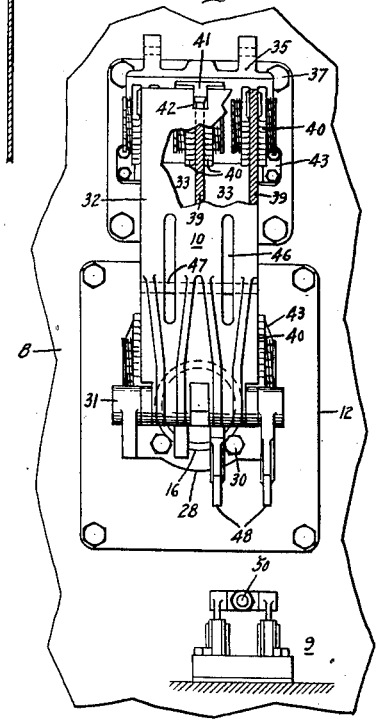
Inventor:
Winton G. Harlow,
by Harry E. Dunham
His Attorney.

Dec. 12, 1944.　　　W. G. HARLOW　　　2,364,974
SWITCHGEAR
Filed April 5, 1943　　　2 Sheets-Sheet 2

Inventor:
Winton G. Harlow,
by Harry E. Dunham
His Attorney.

Patented Dec. 12, 1944

2,364,974

UNITED STATES PATENT OFFICE 2,364,974

SWITCHGEAR

Winton G. Harlow, Upper Darby, Pa., assignor to General Electric Company, a corporation of New York Application April 5, 1943, Serial No. 481,887

6 Claims. (Cl. 200—168)

My invention relates to improvements in switchgear and more particularly the cooling of enclosed switchgear for conducting large currents and especially the mounting of studs and disconnecting switches for conducting high currents from a circuit breaker in one switching compartment to a bus in another switching compartment.

In power stations, metal enclosed switchgear is frequently arranged with a circuit breaker compartment, a switch compartment separated therefrom by a common wall and a bus adjacent the switch compartment. Usually each of these compartments is closed and unventilated, and one or more conducting paths between the switchgear in two adjacent compartments is required. Also, it is desirable that each compartment be isolated from the other so that trouble in one compartment will not spread to the others by transfer of ionized gases, for example. Where high current conducting capacity is required, as in power systems in metropolitan centers, it is difficult to keep the switchgear cool enough to avoid dangerous overheating. Obviously, station sites are too costly to spread structural arrangements for greater cooling. Moreover, the use of lower current densities to avoid overheating is out of the question not only from the standpoint of cost but also availability of suitable conducting material. Furthermore, cooling equipment, such as ventilating fans and the like, when available, increases cost and adds material complication to say nothing about the ever present maintenance requirements.

An object of my invention is to provide for enclosed switchgear an improved arrangement for cooling the conducting path between compartments and, also, certain switchgear in one of the compartments. Another object of my invention is to provide an improved cooling arrangement embodying natural convection and radiation so as to eliminate the necessity for special ventilating equipment and, also, to operate at high current densities in order to obtain maximum current carrying capacity with the minimum of conducting material and cost. A further object of my invention is to provide a cooling arrangement which prevents transfer of dangerous gases and gaseous-like material from one compartment to another. These and other objects of my invention will hereinafter appear in more detail.

In accordance with my invention, I provide, for enclosed switchgear and more specifically metalclad switchgear, a self-ventilated and cooling stud for mounting on a wall between two switchgear compartments. Also, in accordance with my invention, I provide an arrangement for ventilating the mounting into both compartments without interfering with the desired isolation of the compartments. Further in accordance with my invention, I provide a switch in one compartment which is not only self-ventilating but also contributes to the ventilation of the stud mounting. Again in accordance with my invention, I combine the switch and stud mounting for more effective cooling action.

My invention will be better understood from the following description when considered in connection with the accompanying two sheets of drawings, and its scope will be pointed out in the appended claims.

Figure 5:
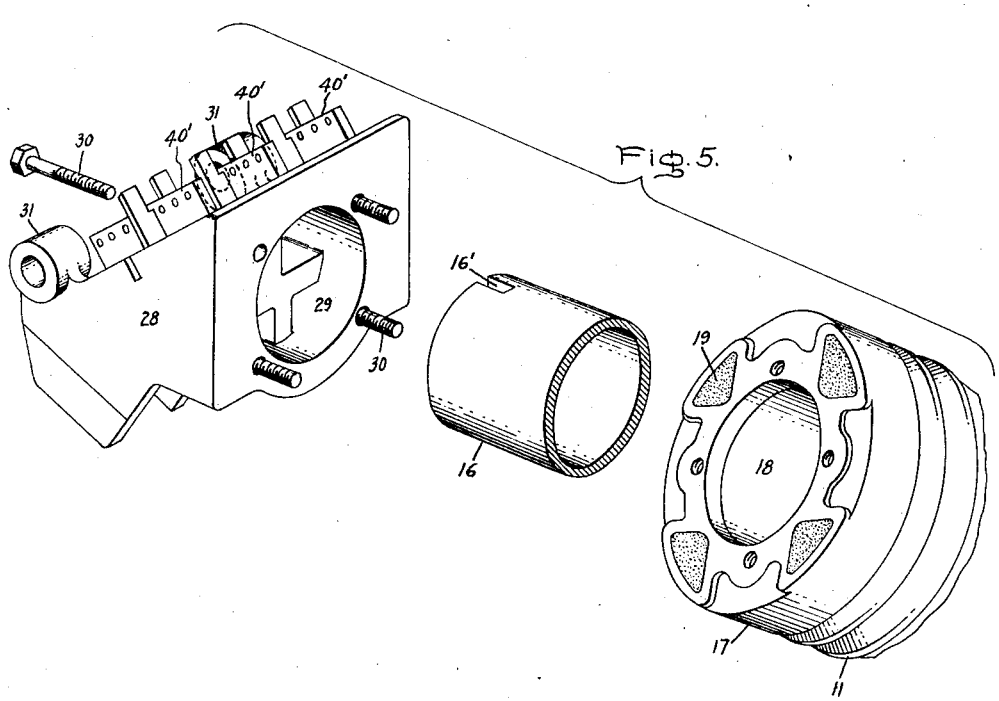

In the accompanying two sheets of drawinsg, Fig. 1 is a side elevation, partly in section, of a combination switch and stud mounting embodying my invention; Fig. 2 is a sectional view on the line 2—2 of Fig. 1; Fig. 3 is an end elevation, partly in section, of the embodiment of my invention shown in Fig. 1; Fig. 4 is an exploded perspective of one end of the stud mounting shown in Fig. 1; and Fig. 5 is an exploded perspective of the other end of the stud mounting shown in Fig. 1.

In the illustrated embodiment of my invention, referring first to Fig. 1, 6 and 7 designate two switchgear compartments which are separated from each other by a partition or common wall 8. In the case of metal enclosed switchgear, the wall 8 as well as the other compartment sides are ordinarily fabricated from steel plates. In accordance with the practice of the art, one of the compartments, such as 6, contains a circuit breaker, not shown, since it constitutes no part of my present invention. The other compartment 7 contains switchgear comprising, as shown, a grounding switch 9 and an isolating switch 10 above which is mounted a bus either in the same compartment or in a separate compartment. The bus is not shown, since it constitutes no part of my present invention. In order to complete a circuit through the circuit breaker and isolating switch to the bus, there must be a suitable electric current conducting path between the compartments 6 and 7, that is, from the circuit breaker to the isolating switch. Such path must not involve any possibility of gaseous transfer between compartments. Otherwise, for example, a fault arc in one compartment could involve a sound compartment by the spread of smoke and ionized gases and cause serious damage to apparatus to say nothing about the impairment of the much desired continuity of service.

In accordance with my invention, I provide a ventilated stud mounting for establishing an electric current conducting path between the compartments 6 and 7 whereby to obtain maximum conductivity with a minimum of conducting material and to minimize heating without special cooling and ventilating apparatus. As shown, this self-ventilated and cooling stud mounting comprises a hollow insulator 11 which extends from one compartment 7 through an opening in the wall 8 into the other compartment 6. This insulator is so secured to the wall 8 as to prevent the passage of gas from one compartment into the other around the exterior of the insulator. For this purpose, there may be provided, as shown in Fig. 1, a flanged metallic collar 12 having a suitably grooved opening which is somewhat larger in diameter than the straight cylindrical section 13 of the insulator 11. The insulator extends through this cap 12 and is cemented therein as indicated at 14. Suitable fastening means, such as bolts 15, serve to secure the collar 12 to the wall 8. Within the insulator 11, which may be of generally cylindrical form, as illustrated, I mount a hollow conducting stud 16 whose external transverse configuration is such, relatively to the internal transverse configuration of the insulator, as to provide, in accordance with my invention, an intervening space for circulation of the ambient. For simplicity, symmetry, and economy of structure, the stud 16 may have the form of a hollow circular cylinder, as shown, but as far as my invention is concerned, neither the insulator 11 nor the stud 16 has to have this particular shape.

Further in accordance with my invention, I mount the stud 16 in the insulator 11 with the ends of the stud in the compartments 6 and 7, respectively, for flow of gas from one compartment, such as 6, and return thereto between the outside of the stud and the inside of the insulator. For this purpose, I provide on the end of the insulator 11 in the compartment 7 an insulator cap 17 which is made of metal or other suitable material and which is provided with a central bore or hole 18 just large enough to receive the stud 16. This cap is suitably cemented to the insulator 11, as indicated more clearly by 19 in Fig. 1. On the end of the insulator 11 in the compartment 6, I provide a cap 20 which is made of metal or other suitable material and which has a central opening larger than the diameter of the stud 16 and also is provided with a plurality of ports 21, as shown in Fig. 4, so as to permit circulation of the ambient from the compartment 6 into the space between the inside of the insulator 11 and the outside of the stud 16 and return to the compartment 6. This cap is also suitably cemented to the insulator, as indicated at 22 in Figs. 1 and 4. In order to center the stud 16 in the insulator at the end thereof in compartment 6, I provide a locking nut 23 which screws on a threaded portion 24 of the stud 16, as will be more clearly apparent from Fig. 4. This nut 23 has a centering flange 25 which fits between the stud 16 and the central opening of the cap 20. The nut 23 is also provided with a plurality of re-entrant portions or notches 26 which register with the ports 21 in the cap 20 when the nut is in the holding position so as to provide free circulation of the ambient from the compartment 6 into the space between the interior surface of the insulator 11 and the exterior surface of the stud 16 and return to the compartment 6, as will be more clearly apparent from Figs. 1 and 4. With this arrangement, it will be obvious that free circulation of the ambient in the space between the outside of the stud 16 and the inside of the insulator 11 will occur in consequence of natural convection due to the heating action of the current flowing in the stud 16. In order to have a similar circulation of the ambient from compartment 7 in the stud 16 without transfer of the ambient from one compartment to the other, I provide means, such as a plug 27, for closing the end of the stud 16 in the compartment 6, as shown in Fig. 1. Thus, with the arrangement so far described, it will be obvious that in consequence of natural convection arising from the heating action of the current flowing in the stud 16, there will be a free circulation of the ambient from the compartment 7 into the interior of the stud 16 and return and, likewise, a free circulation of the ambient from compartment 6 into the space between the exterior of the stud 16 and the interior of the insulator 11 and return to the compartment 6, but there can be no exchange of ambient between the compartments by way of the stud mounting.

Further in accordance with my invention, I provide means for cooling the isolating switch 10 by natural convection so arranged as to assist the natural convection cooling of the stud 16 by increasing the circulation of the ambient therein. For this purpose, I mount on the end of the stud 16 in the compartment 7 a combination hinge and contact block 28 which has a central bore 29 for receiving the end of the stud, as shown more clearly in Fig. 4. The stud 16 and the block 28 may be silver soldered or otherwise suitably secured to each other for good electrical conductivity. For holding the stud 16 against movement from left to right, as viewed in Fig. 1, the block 28 is secured to the insulator 13 by suitable fastening means, such as cap screws 30, as indicated in Fig. 5. Pivoted in bearing bosses 31 on the block 28 is the circuit controlling member or blade 32 of the isolating switch 10.

In accordance with my invention, the blade 32 is provided with one or more longitudinal openings or passages 33 which, at the lower ends, communicate with the compartment 7 through openings 34 in the block 28 and also communicate with the opening in the stud 16 when the switch is closed. The blade 32 is adapted to be operated to effect a connection between the hinge block 28 and a contact terminal block 35 which is mounted on an insulator 36 suitably secured to the wall 8 as by bolts 37. Like the hinge block 28, the terminal block 35 is provided with openings 38 which communicate with the passages 33 in the blade 32 so that in the closed position of the switch 10 there are, in effect, two vertical flues for natural convection of the ambient in the compartment 7 to ventilate and cool the switch structure. Moreover, this natural draft effect also helps to increase the circulation of the ambient in the stud 16 whereby to increase the cooling of this member.

For the contacting connection and for also providing suitable openings to the stud 16 at the lower end of the blade 32, the ends thereof are cut away at a suitable angle, as shown in Fig. 1, so that the walls 39 of the blade structure can engage suitable spring pressed jaw contacts 40 which are mounted in three banks on diaphragms 40' of both the hinge and terminal blocks 28 and 35, respectively. As shown in Fig. 5, the end of the stud 16, which enters the hinge block 28, is notched at 16' so as to register with the middle diaphragm 40' of this block. In order to guide the blade and prevent lateral displacement thereof at the free end especially under fault currents when the switch is closed, the terminal block 35 is provided with suitable means, such as a projection or lug 41, which fits into a notch 42 in the upper end of the blade 32 when it is in the switch closed position. Both the hinge and contact blocks 28 and 35 are also provided with adjustably positioned lateral motion-preventing guide members 43.

For actuating the blade 32 to and from the closed position, it is provided, as shown in Fig. 1, with an operating link 44 having at the blade end a forked connecting member or yoke 45, the arms of which extend through slots 46 in the blade 32 and are pivotally secured to the blade by a pin 47 extending transversely of the blade walls 39. The hinge block 28 is also provided with contact lugs 48 which are arranged to be engaged by the blades 49 of the grounding switch 9, as indicated by the dotted lines in Fig. 1. The grounding switch 9 is provided with an operating link 50. Both the operating links 50 and 44 extend to suitable operating mechanisms often so interlocked that the grounding switch 9 can be operated to open and close only when the isolating switch 10 is open, as will be understood by those skilled in the art.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A ventilated stud mounting for establishing an electric current conducting path between two compartments having a common wall comprising a hollow insulator extending from one compartment into the other through an opening in said wall and secured thereto to prevent passage of gas from one compartment into the other around the exterior of the insulator, a hollow stud insertable in said insulator and having an external transverse configuration relatively to the internal transverse configuration of the insulator such as to provide an intervening space for circulation of gas, means mounting said stud in said insulator with its ends in said compartments respectively for flow of gas from one compartment and return thereto between the outside of the stud and the inside of the insulator, and means closing the end of the stud in said one compartment to permit flow of gas in the stud only from said other compartment and return thereto.

2. In combination, a ventilated stud mounting for establishing an electric current conducting path between two compartments having a common wall comprising a hollow insulator extending from one compartment into the other through an opening in said wall and secured thereto to prevent passage of gas from one compartment into the other around the exterior of the insulator, a hollow stud insertable in said insulator and having an external transverse configuration relatively to the internal transverse configuration of the insulator such as to provide an intervening space for circulation of gas, means mounting said stud in said insulator with its ends in said compartments respectively for flow of gas from one compartment and return thereto between the outside of the stud and the inside of the insulator, means closing the end of the stud in said one compartment to permit flow of gas in the stud only from said other compartment and return thereto, and a switch in said other compartment comprising a hollow circuit controlling member pivotally supported on the stud mounting in conductive relation with the stud for movement in a substantially vertical plane, the opening in said member being substantially vertical when the switch is closed and having its lower end in communication with said other compartment and the opening in said stud.

3. A ventilated stud mounting for establishing an electric current conducting path between two compartments having a common wall comprising a hollow insulator extending from one compartment into the other through an opening in said wall and secured thereto to prevent passage of gas from one compartment into the other around the exterior of the insulator, a hollow stud longer than said insulator and insertable therein with its ends in said compartments respectively, means mounting said stud in said insulator for flow of gas from one compartment and return thereto between the outside of the stud and the inside of the insulator, and means closing the end of the stud in said one compartment to permit flow of gas in the stud only from said other compartment and return thereto.

4. In combination, a ventilated stud mounting for establishing an electric current conducting path between two compartments having a common wall comprising a hollow insulator extending from one compartment into the other through an opening in said wall and secured thereto to prevent passage of gas from one compartment into the other around the exterior of the insulator, a hollow stud mounted in said insulator and extending from one compartment into the other, means closing the end of said stud in said one compartment to permit flow of gas in the stud only from said other compartment and return thereto, and a switch in said other compartment comprising a hollow circuit controlling member pivotally supported on the stud mounting in conductive relation with the stud, one end of the opening in said member communicating with said other compartment and the opening in said stud and the other end communicating with said other compartment.

5. A ventilated stud mounting for establishing an electric current conducting path between two compartments having a common wall comprising a hollow cylindrical insulator extending from one compartment into the other through an opening in said wall and secured thereto to prevent passage of gas from one compartment into the other around the exterior of the insulator, a hollow cylindrical stud having an external diameter materially less than the internal diameter of the insulator, means mounting said stud in said insulator for flow of gas from one compartment and return thereto between the outside of the stud and the inside of the insulator, and means closing the end of the stud in said one compartment to permit flow of gas in the conductor only from said other compartment and return thereto.

6. In combination, a ventilated stud mounting for establishing an electric current conducting path between two compartments having a common wall comprising a hollow cylindrical insulator extending from one compartment into the other through an opening in said wall and secured thereto to prevent passage of gas from one compartment into the other around the exterior of the insulator, a hollow cylindrical stud having an external diameter materially less than the internal diameter of the insulator, means mounting said stud in said insulator for flow of gas from one compartment and return thereto between the outside of the conductor and the inside of the insulator, means closing the end of the stud in said one compartment to permit flow of gas in the stud only from said other compartment and return thereto, and a disconnecting switch in said other compartment comprising a circuit controlling member pivotally supported on the bushing structure in conductive relation with said stud for movement in a substantially vertical plane, said member being provided with a plurality of lengthwise passages communicating with said other compartment and the opening in said stud when the switch is closed.

WINTON G. HARLOW.